(No Model.) 2 Sheets—Sheet 2.
E. ANNAN.
GRAIN BIN.
No. 257,997. Patented May 16, 1882.
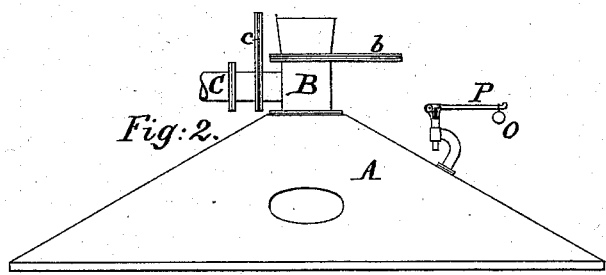
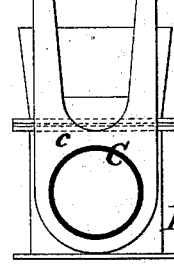
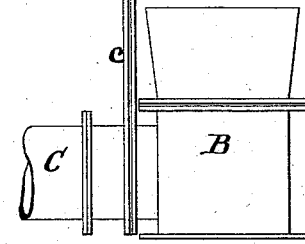
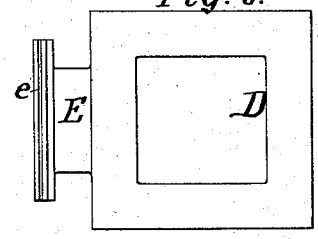
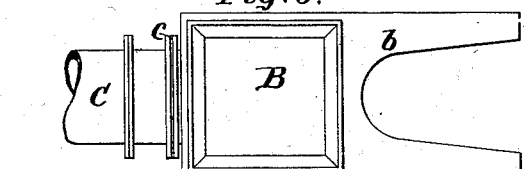
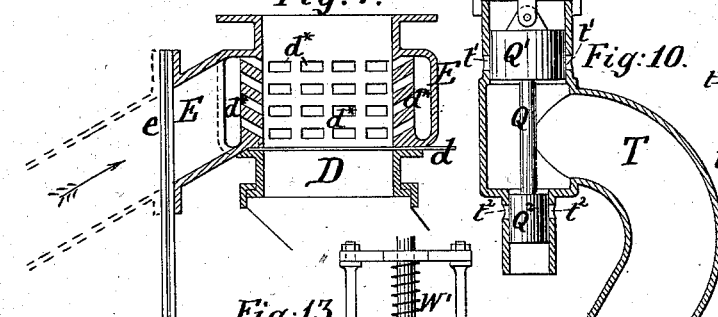
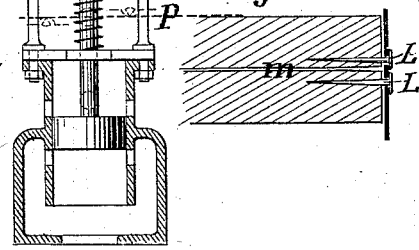
Witnesses:
Charles C. Stetson
Charles R. Searle
Inventor:
Edward Annan
by his attorney
T. D. Stetson
N. PETERS, Photo-Lithographer, Washington, D. C.

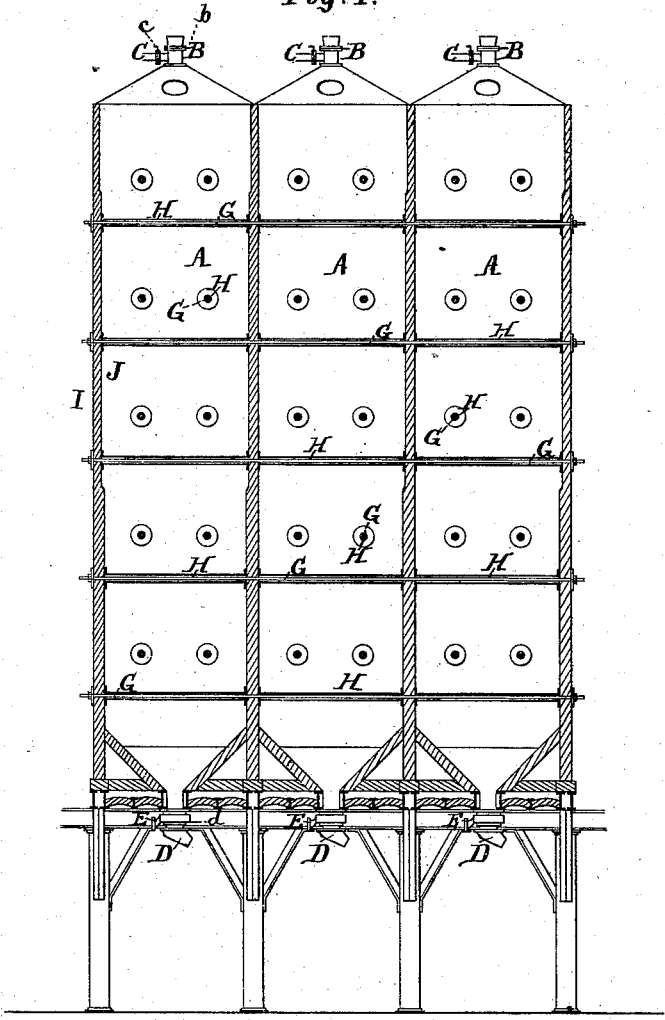

UNITED STATES PATENT OFFICE.

EDWARD ANNAN, OF BROOKLYN, NEW YORK.

GRAIN-BIN.

SPECIFICATION forming part of Letters Patent No. 257,997, dated May 16, 1882.

Application filed September 2, 1881. (No model.)

*To all whom it may concern:*

Be it known that I, EDWARD ANNAN, of Brooklyn, Kings county, and State of New York, have invented certain new and useful Improvements relating to Grain-Bins, of which the following is a full and exact description.

In handling grain in large quantities it is liable to gather dampness and to become deteriorated. It is impracticable with the limited facilities at the depots in large cities to efficiently dry grain. I have devised a treatment and apparatus therefor by which the grain may be treated in the deep rectangular bins ordinarily used in grain-elevators, so as to lower the temperature and protect the mass of grain from destructive agencies and destroy the germs of insects and mold, if any exist, without requiring much skill or expense. There is always a liberal supply of steam-power in or connected with the elevator. I use the term "elevator" in the sense of a building, usually of large capacity, divided into bins, into which grain is lifted by machinery, and from which it is discharged as required. There is usually a liberal supply of cold water, ocean, river, or canal. I employ these agencies to preserve the grain in a manner additional to any ordinarily available.

The accompanying drawings form a part of this specification, and represent what I consider the best means of carrying out the invention.

Figure 1 is a vertical section through a series of bins. The remaining figures represent details, on different scales, but all on larger scales than Fig. 1. Fig. 2 is a front elevation of the top of one of the bins and its attachments. Figs. 3 and 4 and 5 are respectively side and front elevations and a plan of the controlling-valves and their connections at the top of the bin. Figs. 6 and 7 are respectively a plan and a vertical section of the discharge-nozzle and its connected parts at the bottom of the bin. Figs. 8 and 9 are vertical sections, showing the construction of the sides of the bin and two different modes of making them tight. Fig. 8ª is a vertical section, on a larger scale than Figs. 8 and 9, through two adjoining planks and the attached lining material on the plan shown in Fig. 8. Fig. 10 is a vertical section through the double-acting safety-valve which I apply to the top of the bin. Figs. 11 and 12 are diagrams illustrating different positions of this safety-valve. Fig. 13 shows a modified form of this valve.

Similar letters of reference indicate corresponding parts in all the figures where they occur.

The drawings represent the novel parts with so much of the ordinary parts as is necessary to indicate their relation thereto.

I build in the elevator bins or compartments, which may be of the ordinary size and form, and provide for making each air-tight with an air-tight cover and valves. All may be alike, and a description of one may suffice for all.

Referring to the drawings, A is a bin, and B an air-tight nozzle adapted to receive the grain through a suitable spout or other connection above. (Not represented.)

C is a branch from the nozzle B, connected by continuous pipes to an air-pump. (Not represented.)

A valve, $b$, controls the passage B. A valve, $c$, controls the branch connection C. By opening the valve $c$ and working the air-pump a partial vacuum is produced and maintained in the entire bin A. A rapid diminution of the atmospheric pressure and the maintaining of the interior of the bin in that condition for a brief period has a great effect in destroying the germs of vegetable or animal life in the mass of grain.

D is the discharge-nozzle for the grain, provided with an ordinary controlling-valve, $d$.

E is a branch, and controlled by a valve, $e$, and leading, by suitable connections, (shown in dotted lines in Fig. 7,) to an apparatus for delivering cold air.

I propose to produce large quantities of intensely-cold air by a well-known method—that of compressing ordinary air so as to develop latent heat therein, and conducting such compressed air at a high temperature through a pipe or pipes surrounded by cold water. The heat developed by the compression being conveyed away by the water reduces the compressed air to near the ordinary temperature. When at a later period that compressed air so cooled is allowed to expand, the absence of the heat originally possessed is made apparent by the assumption of a very low temperature. I provide for introducing the cold air without a possibility of clogging the apparatus by the grain. Grain will not flow upward through small passages. The connection of the branch nozzle E to the main discharge-nozzle D is peculiarly formed to render available this property, so as to avoid the clogging of the air-passages by grain. The nozzle E completely encircles the main passage D. The passage D is continued with its ordinary size and form down through the interior of the building. A series of apertures, $d^*$, are produced in this inner wall of metal, each inclined upward from the interior outward, as indicated. In the use of the apparatus the grain descending from above partially fills these inclined apertures, but does not flow out through them.

It is not proposed to admit the air while the grain is flowing out. It is not probable that the air would percolate upward through the interstices in the grain with sufficient rapidity to produce the desired effect when the grain is descending. But when the grain is held at rest by the closing of the valve $d$ a supply of intensely-cold air under a pressure but little above that of the atmosphere being introduced through the branch nozzle E flows around in the belt represented and enters through all the orifices $d^*$, and percolates through the grain therein, and rises through the grain in the central passage, D, and in a short time appears at the top of the mass of grain in the bin A. The top nozzle is left open to allow the discharge of the air previously contained in the bin, and it should be kept open until the cold air traversing up through the grain and escaping at the top has lowered the temperature of the entire mass to a sufficient degree. Then the supply of cold air at the bottom may be stopped, the valve at the top left open or closed, as may be preferred, and attention may be turned to another bin.

It is common to make the walls of the bins of wood, strongly fastened together. This makes a strong and sufficiently non-conducting wall for my purpose. But it should be more than ordinarily braced internally, to better enable it to withstand the slight plus pressure when the compressed air is allowed to move up through the grain, and especially to endure the diminution of pressure when the contents of the bin are subjected to a partial vacuum, as first described. I have shown transverse rods G of wrought-iron extending through thimbles or pipes H of cast-iron, having their ends flanged to abut fairly against the interior of a bin and withstand compression.

I employ peculiar provisions to make the bins air-tight and allow for the springing and distortion due to changes of temperature and of moisture, as also the changes of form obviously resulting from the change of conditions as the bins are successively filled and emptied. I join the branch nozzles or air-nozzles C and E to the main or grain nozzles B and D, so that there is but one junction of the whole to the bin. This junction is fitted with a gasket of rubber or analogous material, which, being strongly compressed by bolts, insures an air-tight joint. The several joints in the body of the bin, and also in the top and bottom, are stopped by a covering of air-tight material spread as a layer over the interior and strongly fastened. I propose a thin sheet of rubber held between layers of stout paper and secured by small nails thickly set along each side of each joint.

I can make the dividing-walls between the bins of greater thickness at the bottom than at the middle, and of still less thickness at the top, the changes being made, as usual in these constructions, by sudden offsets. This is more convenient in the provision and application of the lumber; but I prefer to avoid sudden offsets, and to make them always gradual, as indicated. Fig. 8 shows the wall of a bin lined with this material nailed on without other protection.

I have devised another mode of attachment which considerably reduces the labor of nailing, and I believe will hold the air-tight lining with equal strength and with equal or still greater allowance for springing, warping, and distortion. This is shown in Fig. 9.

In both the figures, I is the material of the wall or partition, which may be formed in the usual manner of two-inch plank, strongly secured one upon another by stout nails driven down through each piece as it is successively applied, care being taken to keep the work true as it proceeds. J is my lining of air-tight flexible material.

In Fig. 9, K K are clapboards. Nails, which may be stout and at considerable distances apart, are driven through the clapboards K in the ordinary manner. Small nails, which should have large heads, are driven close together along each side of each joint in the mode shown in Fig. $8^a$. In Fig. $8^a$ these nails are shown and designated L. In this figure, $m$ is a joint between two separate planks in the partition, or one of the cracks which are liable to form in the wood in seasoning.

The considerable distance between the top and bottom of a bin and the exigencies of working the apparatus in a large way by numerous assistants, some of whom may be only imperfectly acquainted with the apparatus, renders it necessary to provide against mischief from an excessive pressure or excessive vacuum. A vacuum may obviously be made excessive. The pressure in excess of that of the atmosphere when it is discharged from a pipe or reservoir under great pressure may possibly rend the bin by its being applied when the discharge-valve is closed. I employ a single safety-valve, which is capable of relieving the apparatus from an excess in either direction.

P is a lever loaded with an adjustable weight, O, and arranged to turn on either of the centers $p'$ or $p^2$. The valve is formed of two pistons, $Q'$ $Q^2$, of unequal size, connected by a rigid rod, Q, and united by a link, R, to the lever P at the point $p$. The pistons work in corresponding cylinders, open at both ends. The central portion between the pistons is connected to the interior of the bin A by a liberal passage, T. Two sets of orifices, $t'$ $t^2$, are arranged as shown.

When there is an excessive pressure in the apparatus, the same, being felt on the difference of areas of the two pistons $Q'$ $Q^2$, forces them up, causing the lever P to turn on its center $p'$. This uncovers the orifices $t'$ and allows the air to escape until the pressure is reduced. In this movement the knife-edge at $p^2$ lifts entirely out of connection with its seat, and it does not for the time being serve any function.

When the parts are at rest both the knife-edges $p'$ and $p^2$ may bear with equal or unequal force on their respective seats. This is the ordinary condition of the apparatus, varying, of course, as a vacuum or plenum exists in the bin A.

When the vacuum in the bin becomes excessive the pressure of the external air on the unbalanced portion of the large piston $Q'$—in other words, on that portion of the piston $Q'$ which is in excess of the area of the opposing piston $Q^2$—depresses both pistons and pulls down on the link R with such force as to lift the weight O by turning on the center $p^2$. In this movement the knife-edge $p'$ moves entirely out of contact with its seat and fails to perform any function. This movement—the turning on the knife-edge $p^2$ by the depression of the small piston $Q^2$—uncovers the series of orifices $t^2$ and allows a rush of air inward through these orifices and down through the passage T to relieve the vacuum in the bin. This continues until the vacuum is sufficiently relieved, when the parts again resume their normal condition.

Fig. 13 shows a modification, in which a single piston is actuated upward by an excessive pressure and downward by an excessive vacuum, so as to uncover holes correspondingly marked. Spiral springs $W'$ $W^2$, acting on the adjustable nuts $w'$ $w^2$ on the rod Q, serve to resist the force of the plenum and vacuum, respectively, in opposite directions, and may be independently adjusted by adjusting the separate nuts. Dotted lines in this Fig. 13 show how a lever corresponding to the lever P may be applied to this form of the safety-valve, if preferred.

Modifications may be made in many of the details. Some parts of the invention may be used without the others.

Carbonic acid or other gas fatal to animal life, but not injurious to the grain, may be generated by artificial or suitable means introduced through the nozzle E and caused to enter the grain through the inclined apertures $d^*$ and fill the interstices in the grain in the bin. Animal life may be destroyed by that means even at the ordinary temperatures. Such gas may be made under high pressure or compressed by pumping or otherwise to a high pressure and expanded, thereby producing cold and lowering the temperature of the mass of the grain in the same manner as has been already explained for air.

The thickness of the walls of the grain-discharge passage D may be increased and the inclination of the apertures $d^*$ therein may be varied.

For the air-tight lining of the bins I can use rubber alone of proper thickness, or a good quality of impervious paper in two or more thicknesses alone. I propose in some cases, from considerations of economy, to employ paper alone, in two or more thicknesses, when the clapboards K are employed.

Instead of extending the transverse rods G through thimbles H, I can effect the bracing by sufficiently stout rods with nuts both inside and outside of the walls; or I can use one or more rigid struts of wood adjacent to each rod; or I can brace the bin with braces of wood alone, strongly engaged by notching or otherwise with the sides of the bin.

I claim as my invention—

1. Air-tight bins provided with valves for controlling the flow of air as well as of grain, substantially as herein specified.

2. The grain-bins A, formed with a strong and close main wall, an impervious flexible lining, and a further layer of overlapping material, as clapboards, combined substantially as herein specified.

3. The combination, with one or more grain-bins, of tight-shutting valves for the admission and discharge of the grain, and provisions for introducing cold air to fill the interstices of the grain, as herein specified.

4. In a grain-bin having provisions for the discharge of grain, a separate provision for the introduction of air, the apertures $d^*$ arranged to induct the air without discharging grain, as herein specified.

5. The valve $d$, discharge-nozzle D, provided with the inclined apertures $d^*$, valve $e$, and air-induction nozzle E, so arranged that the latter surrounds the former, as and for the purposes herein specified.

6. The nozzle B, for the entrance of grain, and the branch nozzle C, for the eduction of air, combined with each other and with the bin and adapted for joint operation, as herein specified.

7. In an air-tight grain-bin having provisions for the introduction and removal of grain and of air, a safety-valve opening in two directions, adapted to prevent an excess of pressure either inward or outward, substantially as herein specified.

In testimony whereof I have hereunto set my hand, at New York city, New York, this 1st day of September, 1881, in the presence of two subscribing witnesses.

EDWARD ANNAN.

Witnesses:
GEO. B. MALLORY,
CHARLES C. STETSON.